US011752454B2

(12) United States Patent
Mimura

(10) Patent No.: US 11,752,454 B2
(45) Date of Patent: Sep. 12, 2023

(54) FILTER DEVICE

(71) Applicant: NIFCO INC., Yokosuka (JP)

(72) Inventor: Kouhei Mimura, Yokosuka (JP)

(73) Assignee: NIFCO INC., Yokosuka (JP)

( * ) Notice: Subject to any disclaimer, the term of this patent is extended or adjusted under 35 U.S.C. 154(b) by 111 days.

(21) Appl. No.: 16/494,980

(22) PCT Filed: Mar. 20, 2018

(86) PCT No.: PCT/JP2018/010986
§ 371 (c)(1),
(2) Date: Sep. 17, 2019

(87) PCT Pub. No.: WO2018/174048
PCT Pub. Date: Sep. 27, 2018

(65) Prior Publication Data
US 2020/0197839 A1      Jun. 25, 2020

(30) Foreign Application Priority Data

Mar. 23, 2017   (JP) ................................. 2017-056841

(51) Int. Cl.
*B01D 29/35*      (2006.01)
*B01D 39/16*      (2006.01)

(52) U.S. Cl.
CPC ............. *B01D 29/35* (2013.01); *B01D 39/16* (2013.01); *B01D 2201/20* (2013.01)

(58) Field of Classification Search
CPC .... B01D 29/35; B01D 2201/20; B01D 39/16; B01D 2201/184; B01D 29/44;
(Continued)

(56) References Cited

U.S. PATENT DOCUMENTS 4,270,728 A * 6/1981 Peloza ............... B60H 1/00485
                                                                137/338
4,312,479 A    1/1982 Tolan
(Continued)

FOREIGN PATENT DOCUMENTS

JP        S62-47764 U      3/1987
JP        S6247764 U  *   3/1987    ............. F02M 37/22
(Continued)

OTHER PUBLICATIONS

PCT/ISA/210, "International Search Report for International Application No. PCT/JP2018/010986," dated Jun. 5, 2018.

*Primary Examiner* — Bobby Ramdhanie
*Assistant Examiner* — Donovan Bui-Huynh
(74) *Attorney, Agent, or Firm* — Manabu Kanesaka

(57) ABSTRACT

A filter device is formed by installing an orifice member to the fluid passage of a filter body and avoids being functionally impaired by residue such as shavings generated during the installing of the orifice member. A filter device is provided with a filter body that has a fluid passage; and an orifice member that is installed in the fluid passage. The orifice member is provided with a body that has an orifice, a first flange that is press-fitted into the large-diameter part of the fluid passage, and a second flange that forms a closed trap space between itself and the first flange. A knurling is provided to the outer peripheral surface of the first flange. A knurling is provided to the outer peripheral surface of the first flange. Shavings formed during the installing of the orifice member to the filter body are captured in the trap space.

5 Claims, 7 Drawing Sheets

(58) Field of Classification Search
CPC .............. B01D 35/02; F02M 61/165; F02M 2200/505; F02M 37/32; F02M 51/0671; F02M 51/0678; F02M 61/205; F02M 2200/04; F02M 2200/8061; F02M 2200/858; F02M 47/027; F02M 51/0667; F02M 51/0682; F02M 61/14; F02M 61/166; F02M 61/168

See application file for complete search history.

(56) References Cited

U.S. PATENT DOCUMENTS

| | | | |
|---|---|---|---|
| 5,255,794 | A | 10/1993 | Lloyd |
| 2003/0052052 | A1* | 3/2003 | Boast .................. F02M 61/165 210/429 |
| 2007/0209687 | A1 | 9/2007 | Fistler et al. |
| 2008/0178457 | A1 | 7/2008 | Nagasaka et al. |

FOREIGN PATENT DOCUMENTS

| | | | | |
|---|---|---|---|---|
| JP | H03-62287 | U | | 6/1991 |
| JP | H08-210211 | A | | 8/1996 |
| JP | H08210211 | A * | 8/1996 | ............. B01D 27/08 |
| JP | 2008-080295 | A | | 4/2008 |
| JP | 2008-202591 | A | | 9/2008 |
| JP | 5152005 | B2 | | 2/2013 |
| JP | 2017-120030 | A | | 7/2017 |

* cited by examiner

FILTER DEVICE

RELATED APPLICATIONS

The present application is National Phase of International Application No. PCT/JP2018/010986 filed Mar. 20, 2018, and claims priority from Japanese Application No. 2017-056841, filed Mar. 23, 2017, the disclosure of which is hereby incorporated by reference herein in its entirety.

FIELD OF THE INVENTION

The present invention relates to a filter device used for filtering a fluid.

BACKGROUND OF THE INVENTION

In a filter device used for filtering fluid in the fluid passage of an operation oil passage and so on, in addition to a filtering function, it may be required to reduce a pressure of the fluid. In this case, it is considered to form a filter device by forcibly entering an orifice member having a pressure reducing function into a fluid passage of the filter device with filtering function.

PRIOR ART

Patent Document: Japanese Patent No. 5152005

SUMMARY OF THE INVENTION

Problem to be Solved by the Invention

In the meantime, when this kind of orifice member is forcibly inserted into the filter body, since residues (shavings) are formed, it is necessary such that the shavings do not reduce the function while remaining in the filter body. However, in the prior art, there is no structure for properly handling the counter-measure for the shaving.

For example, in Patent Document 1 (Japanese Patent No. 5152005)) as prior art considering counter-measure of foreign material in the filter device, there was proposed an invention such that when a filter brakes, small pieces formed by breaking the filter does not flow downstream. However, since this structure does not have a relation with a structure assembling the orifice member with the filter body, this is not directly applied as the counter-measure of the residue formed at the assembly of the filter device.

The invention has been made in view of the above circumstances, and an object of the invention is to provide a filter device, which has a structure of assembling an orifice member to a fluid passage of a filter body, wherein the function thereof is not impaired by the residue formed by shavings and so on generated at the time of assembly of the orifice member.

Means to Solve the Problems

In order to attain the above object, the present invention selects the following solution. Namely, in a filter device comprising a filter body having a fluid passage, and an orifice member assembled in the fluid passage of the filter body, the orifice member is provided with an engaging member engaging an inner peripheral face of the fluid passage, and one of the filter main member or the orifice member is provided with a trap member forming a closed trap space with respect to the engaging member.

In the above solution, since the trap member is formed adjacent to the engaging member, and the space between the engaging member and the trap member is the closed trap space, the residue (for example shavings) formed at the time of assembling the orifice member to the filter body (for example, pressure inserting) is caught in the trap space to prevent the residue from entering into the filter device beyond the trap member. Accordingly, it is possible to properly prevent lowering the function (for example, breakage of the filter member or clogging of the orifice) of the filter device by the residue at the time of assembly.

The filter body may be provided with a filtering member arranged on a side opposite to the trap space of the trap member. In this case, the residue can be properly caught by the trap member before the filter member.

The filter main member may be made of synthetic resin. Also, the orifice member may be made of metal. In this case, the resin shavings formed at the time of assembling the orifice member made of metal with the filter member made of resin are properly caught in the trap space by the trap member.

The engaging member is a first flange formed on an outer periphery of the orifice member, and the first flange is provided with knurling at a portion engaging an inner periphery of the fluid passage. In this case, the knurling of the orifice member bites the inner surface of the fluid passage of the filter body, so that assembly of the orifice member with the filter body can be made easily, and the shavings of the filter body by the knurling process are caught in the trap space by the trap member.

The trap member may be a second flange formed at the orifice member. In this case, since the trap space is formed between the two flanges formed at the orifice member, the proper trap space is formed by the simple structure.

The trap member may be an annular portion formed on an inner periphery of the fluid passage. In this case, since the trap space is formed between the flange of the orifice member and the annular portion of the filter body, the proper trap space is formed by the simple structure.

Advantages of the Invention

In accordance with the invention, the residue (for example shavings) formed at the time of assembling the orifice member with the filter body can be caught in the trap space by the trap member, and does not enter into a space of the filter device. Thus, it is possible to prevent breakage and lowering of the function of the filter device by invasion of the residue.

DETAILED DESCTION OF THE INVENTION

Figure 1:
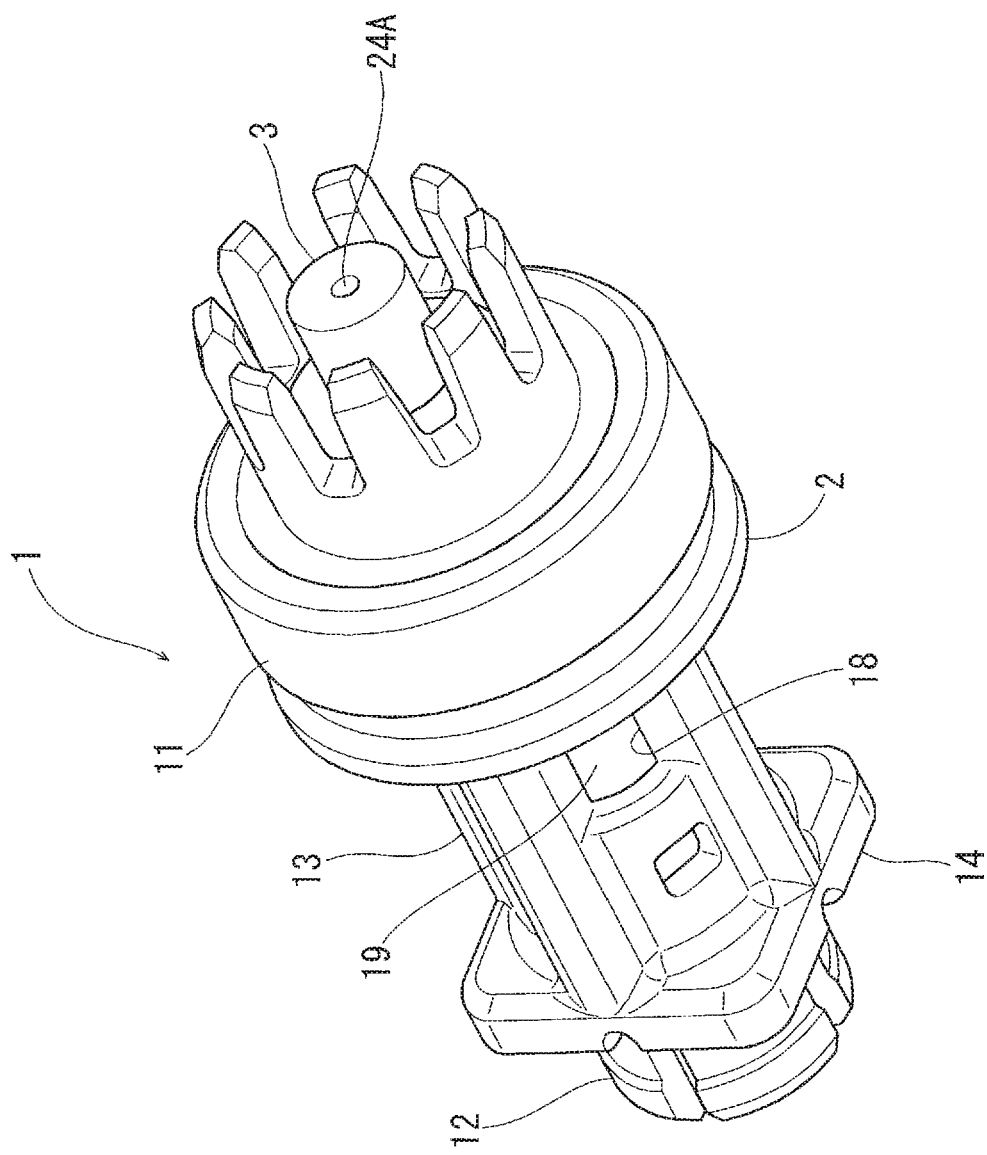
FIG. 1 is a perspective view showing a first embodiment of a filter device of the invention.
Figure 2:
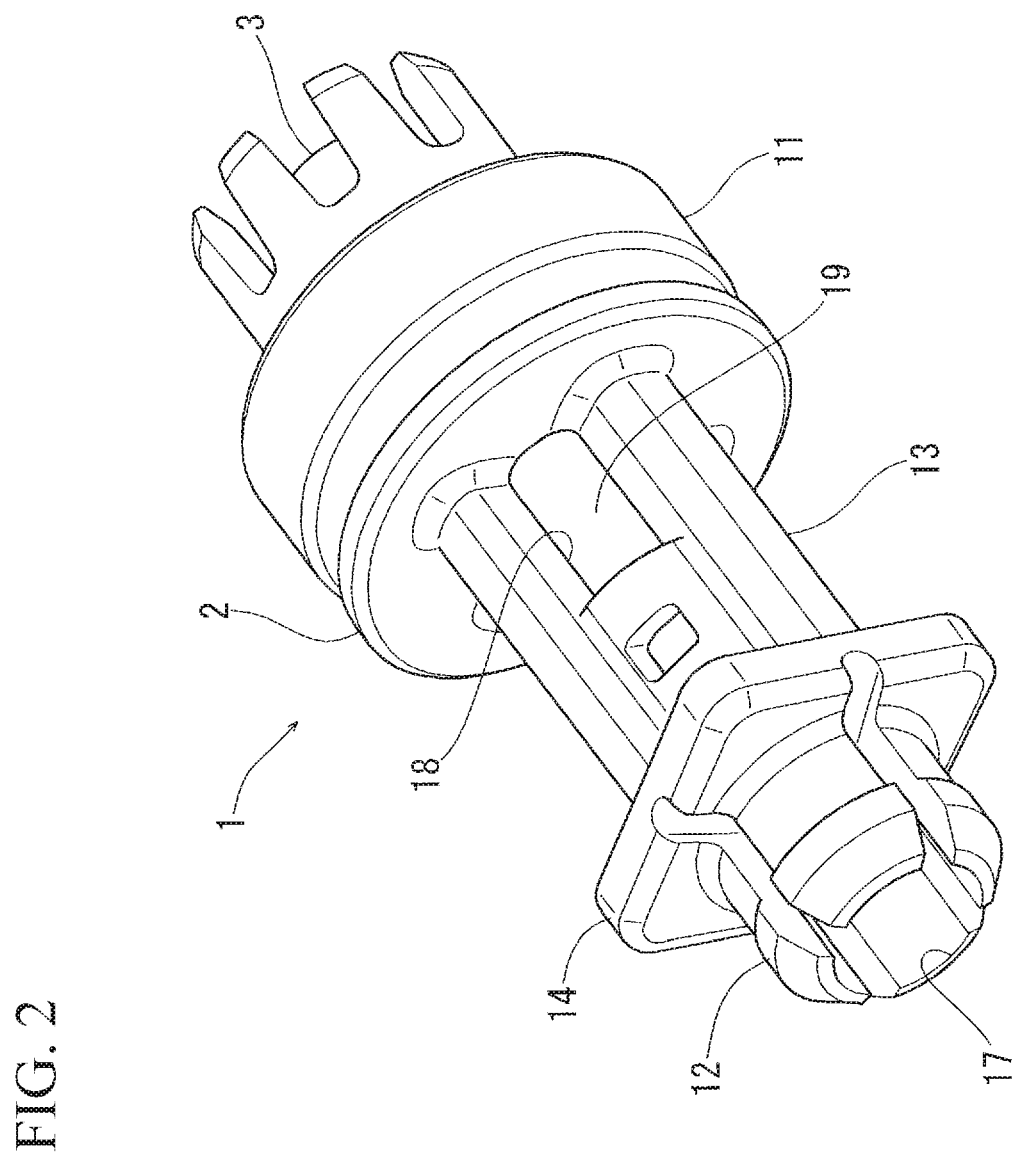
FIG. 2 is a perspective view showing the filter device of the invention.

Herein below, the embodiments of the invention are explained based on the drawings.

FIG. 1 to FIG. 5 show a first embodiment of a filter device of the invention. The filter device 1 is provided in a fluid passage of, for example, an operation oil passage of a lash adjustment of an engine of a vehicle, and is made of resin. As shown in the drawings, the filter device 1 comprises a filter body 2, and an orifice member 3 assembled with the filter body 2.

The filter body 2 includes a base end 11 in about cylindrical shape with a large diameter, a front end 12 in about cylindrical shape with a small diameter, and a middle portion 13 arranged between the base end 11 and the front end 12. Incidentally, a flange 14 is arranged between the front end 12 and the middle portion 13.

Figure 4:
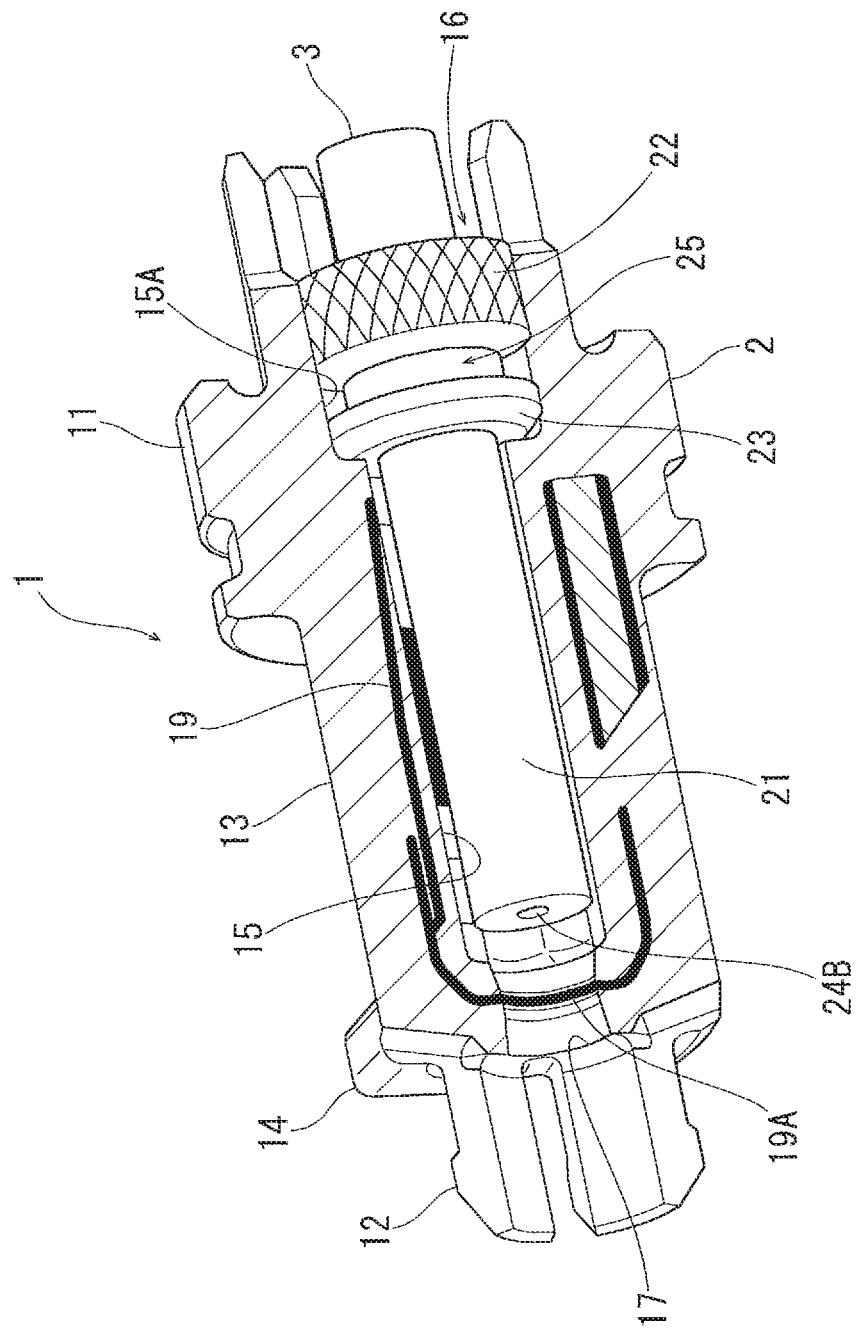
FIG. 4 is a diagram cut in part showing the filter device of the invention.
Figure 5:
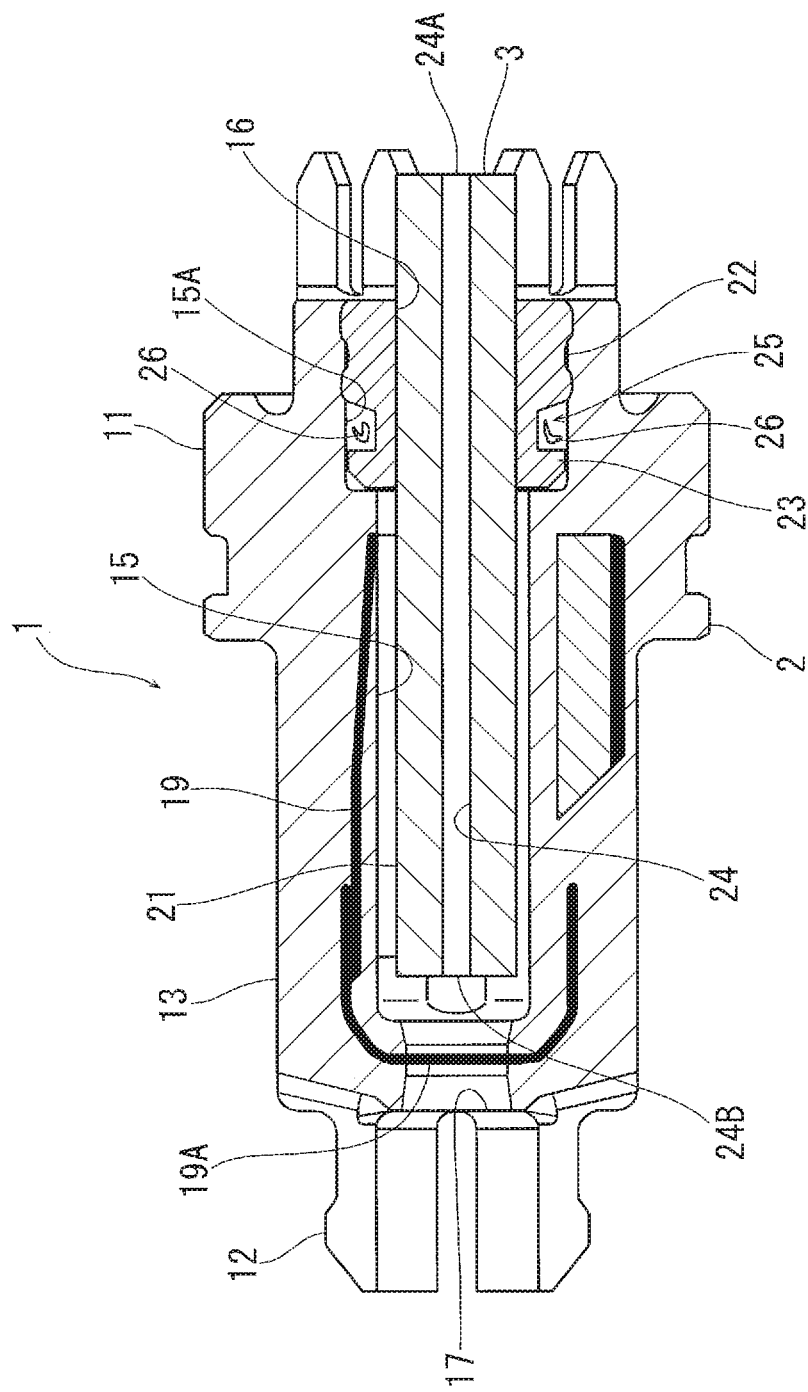
FIG. 5 is a sectional view of the filter device of the invention.

As well shown in FIG. 4 and FIG. 5, the filter body 2 is formed with a fluid passage 15 passing through the base end 11, the middle portion 13 and the front end 12 and extending in the longitudinal direction of the filter body 2. The base end 11 is a portion forming an upstream side (introducing side of a fluid), and an entrance 16 of the fluid passage 15 (installation portion of the orifice member) is opened. On the other side, at the front end 12, a front exit 17 of the fluid passage 15 is opened, and the fluid passage 15 extends from the entrance 16 to the front exit 17. Further, in the middle portion 13, a plurality of side exits 18 is formed, and the side exits 18 communicate with the fluid passage 15.

Incidentally, in the explanation of the embodiments of the invention, for the sake of explanation, the base end of the filter 11 side (entrance 16) is regarded as an upstream side, and the front end 12 side (front exit 17 and side exits 18) is regarded as a downstream side (exit side of the fluid). However, the using way of the filter device 1 is not limited in this way, and in the filter device 1, it is possible to use the front end 12 side (front exit 17 and side exits 18) as the upstream side (entrance side of the fluid), and the base end 11 side (entrance 16) as the downstream side (exit side of the fluid). Namely, the expressions of the upstream and downstream are used for the purpose of explanation and do not limit the range of the filter device of the invention.

Figure 3:
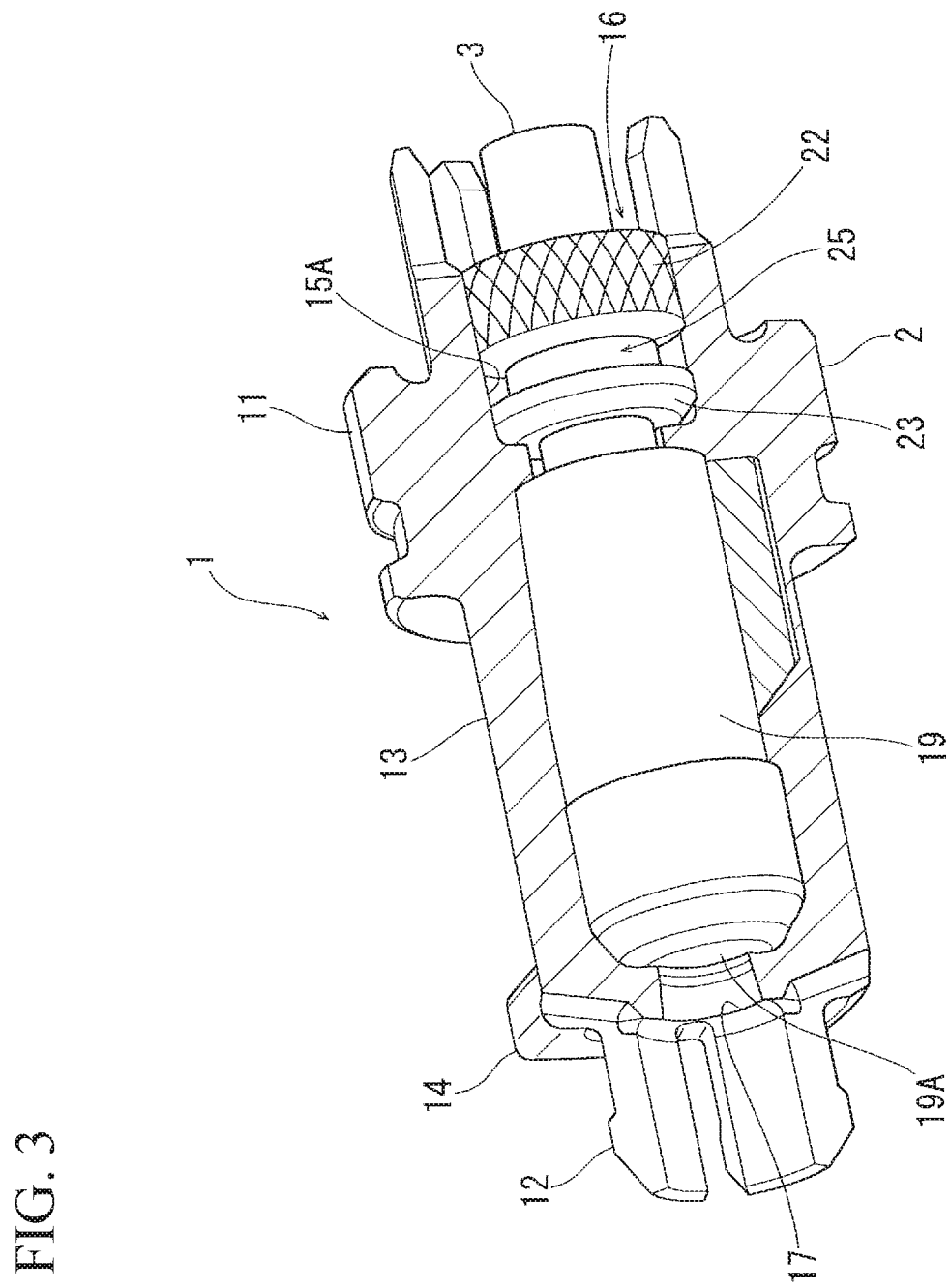
FIG. 3 is a diagram cut in part showing the filter device of the invention.

As shown from FIG. 3 to FIG. 5, the filter body 2 is provided with a filtering member 19 arranged around the fluid passage 15. The filtering member 19 is, for example, a cylindrical mesh member made of metal, wherein a front end side (front exit 17 side) only includes a bottom 19A, and a bottom (entrance 16 side) opens. As a result, fluid (for example, operation oil) intruded into the fluid passage 15 from the entrance 16 side (base side opening 24A of the orifice 24) is filtered by the filtering member 19, and is exited from the front exit 17 and the side exits 18.

The orifice member 3 is a member assembled with the filter body 2 by, for example heat pressure insertion, and is made of, for example, metal. As shown in FIG. 4 and FIG. 5, the orifice member 3 is provided with a main member 21 in about cylindrical columnar shape, a first flange 22 provided around an outer periphery of a bottom of the main member 21, and a second flange 23 provided for a predetermined distance from the first flange 22. Incidentally, the first flange 22 and the second flange 23 correspond to an engaging member and a trap portion in the claims, respectively.

On a central axis of the main member 21 of the orifice member 3, an orifice 24 penetrating through the orifice member 3 in the longitudinal direction. Thus, when the orifice member 3 is assembled with the filter body 2, the fluid introduced from the base side opening 24A of the orifice 24 is pressure-reduced through the orifice 24 and is introduced to the fluid passage 15 from the front side opening 24B of the orifice 24.

The first flange 22 and the second flange 23 have an outer diameter substantially the same as an inner diameter of the large diameter portion 15A at the base end side (entrance 16 side) of the fluid passage 15. Also, an outer periphery of the first flange 22 has knurling. As a result, when the flange 22 of the orifice member 3 is heat-pressure-inserted to the large diameter portion 15A of the fluid passage 15, knurling of the flange 22 bites into the inner surface of the large diameter portion 15A, so that the orifice member 3 is fixed to the filter body 2 by melting.

The second flange 23 is arranged at a front side (downstream side) relative to the first flange 22, and comes to a condition of abutting against the inner periphery of the large diameter portion 15A of the fluid passage 15. As a result, at a downstream side of the first flange 22, a trap space 25 which is a closed space held between the first flange 22 and the second flange 23 is formed.

In this structure, even if the residue (shavings) 26 formed when the first flange 22 is pressure-inserted into the large diameter portion of the fluid passage 15 enters to the downstream side of the flange 22, since the residue can be caught in the trap space 25, the residue does not enter into the fluid passage 15 beyond the second flange (trap portion) 23. Accordingly, the function of the filter device is not damaged by the residue formed at the assembly operation. Namely, the damage of the mesh or clogging of the orifice 24 due to invasion of the residue entering into the filter device is properly prevented.

Figure 6:
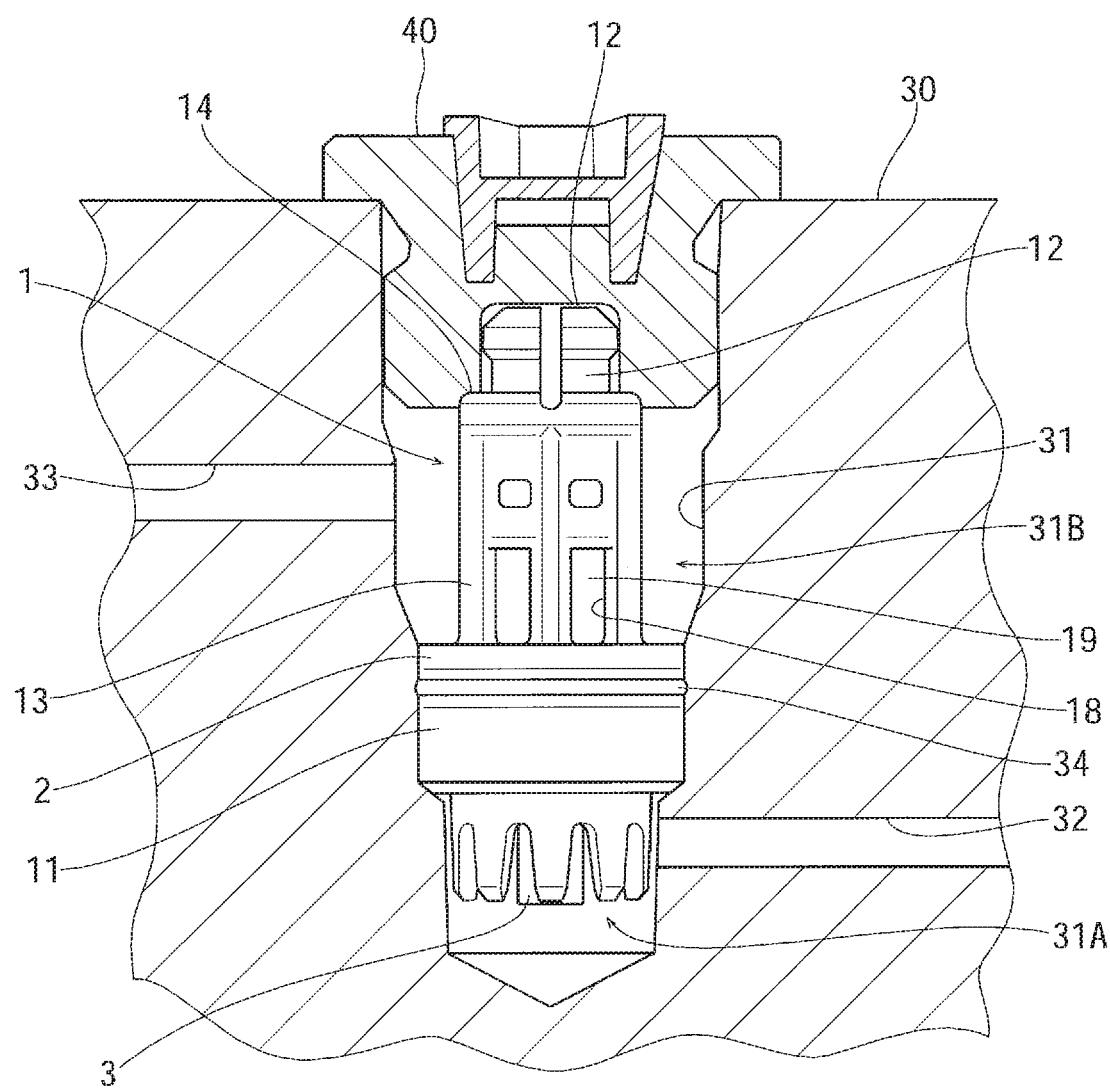
FIG. 6 is a sectional view of the filter device showing an example in use of the invention.

In FIG. 6, an example of use of the filter device of the embodiment is shown. As shown in the drawing, the filter device 1 is installed from the base end 11 side into an attachment hole 31 of an engine housing 30. An opening of the attachment hole 31 is closed by an engine cap 40. An end (entrance of oil) of the orifice member 3 of the filter device 1 is arranged in a space 31B formed between the engine cap 40 in the attachment hole 31 and the base end 11 and communicates with the oil path 32. Also, the side exits 18 of the filter device 1 are arranged at the space 31B formed at the front side more than the base end 11 in the attachment hole 31, and communicate with the oil path 33. Incidentally, an O-ring 34 is attached around the outer periphery of the base end 11, and seals between the space 31A and the space 31B.

Figure 7:
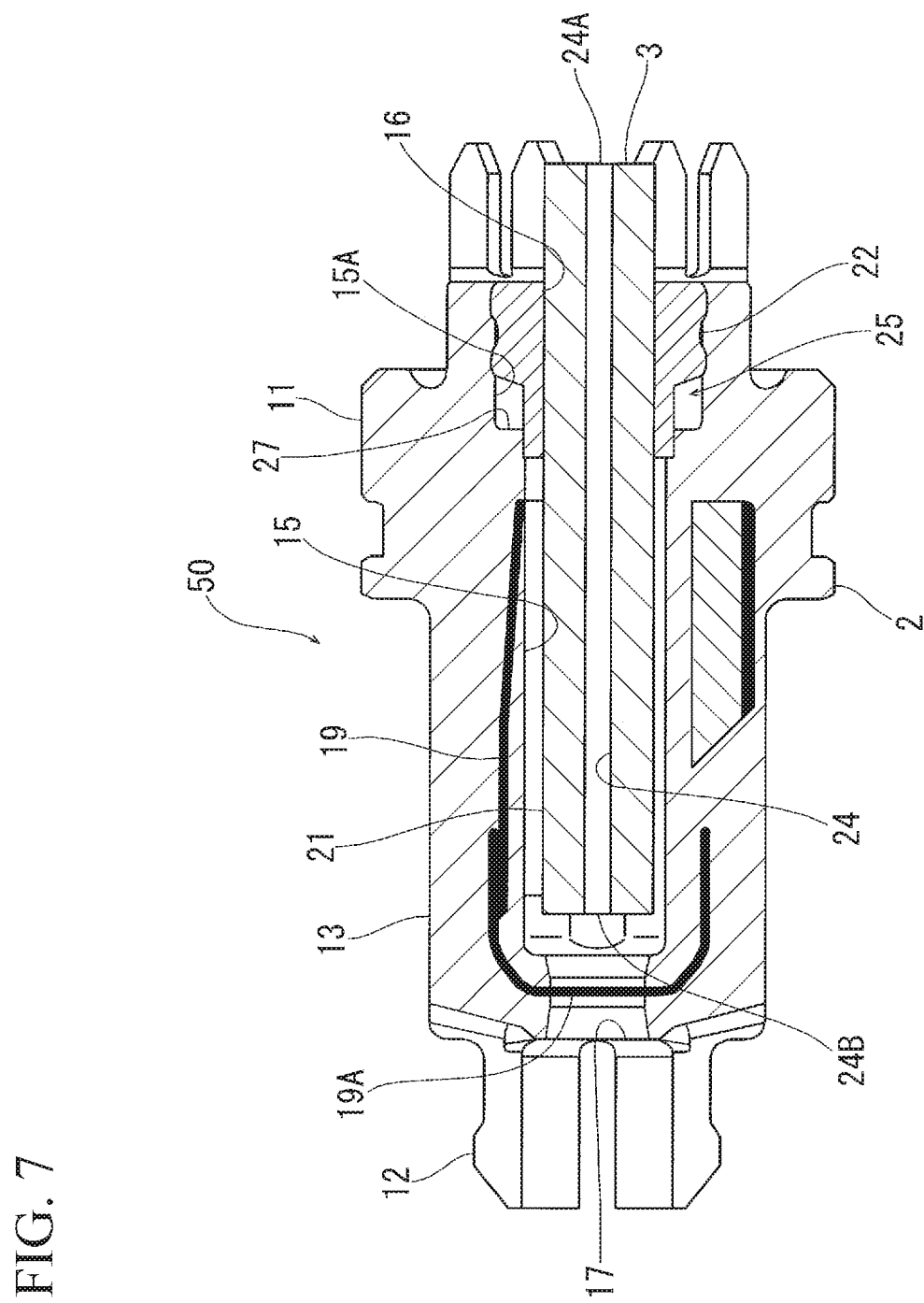
FIG. 7 is a sectional view showing a second embodiment of the filter device of the invention.

FIG. 7 shows a filter device 50 of a second embodiment of the invention. In the filter device 50 of the embodiment, in place of the second flange 23 of the orifice member 3 in the first embodiment, an annular portion 27 extending along a peripheral direction is formed on an inner periphery of the fluid passage 15 (large diameter portion 15A). Incidentally, since other portions of the filter device 50 are the same as those of the filter device 1 of the first embodiment, the same reference numerals are assigned in the drawing and the explanation thereof is omitted.

In this way, the annular portion 27 is made as a trap portion by forming the annular portion 27 at the fluid path 15 of the filter body. Thus, it is possible to form the trap space 25 in the space formed between the annular portion 27 and the first flange 22 of the orifice member 3.

As above, the embodiments of the invention are explained, but the invention is not limited by the above embodiments, and it is possible to change the structure of the invention within the scope of the claims of the invention. For example, in the above embodiments, the orifice member 3 is heat-pressure-inserted into the filter body 2, but the invention is not limited to the type. For example, the orifice member 3 may be cold-pressure-inserted into the filter body.

APPLICABILITY OF INDUSTRY

The present invention can be used for the filter device provided in the operation oil passage and so on.

EXPLANATION OF NUMERALS

Explanation of Numerals

- 1, 50: Filter device
- 2: Filter body
- 3: Orifice member
- 11: Base end of filter main member
- 12: Front end of filter main member
- 13: Middle portion of filter main member
- 14: Flange of filter main member
- 15: Fluid passage
- 16: Entrance
- 17: Front exit
- 18: Side exit
- 19: Filtering member
- 19A: Bottom of filtering member
- 21: Main member of orifice member
- 22: First flange
- 23: Second flange
- 24: Orifice
- 24A: Base side opening of orifice
- 24B: Front side opening of orifice
- 25: Trap space
- 26: Residue (Shaving)
- 27: Annular portion
- 30: Engine housing
- 31: Attachment hole
- 32: Oil path
- 33: Oil path
- 34: O-ring
- 40: Engine cap

What is claimed is:

1. A filter device comprising:
    a filter body having a base end, a flange, a middle portion between the base end and the flange, and a fluid passage passing through the filter body;
    an orifice member substantially having a cylindrical shape and assembled in the fluid passage,
    wherein the orifice member includes a main member, an orifice penetrating through the main member, side exits formed in the main member to communicate the orifice and the fluid passage, a first flange portion formed on an outer peripheral face of the main member and having a knurling portion engaging an inner peripheral face of the base end around the fluid passage such that the main member is spaced from the inner peripheral face of the fluid passage, a second flange portion formed on the outer peripheral face of the main member and a trap member disposed around the main member between the first flange portion and the second flange portion in which a residue formed when the first flange portion is pressure-inserted into the fluid passage is caught, and
    a filtering member which is a cylindrical mesh member with a bottom and is arranged to surround the main member, the bottom covering a front side opening of the orifice member so that fluid flows through the filtering member and the bottom.

2. A filter device according to claim 1, wherein the filter body is made of synthetic resin.

3. A filter device according to claim 1, where the orifice member is made of metal.

4. A filter device according to claim 1, further comprising an engine cap covering a front end of the filter body.

5. A filter device comprising:
    a filter body having a base end, a flange, a middle portion between the base end and the flange, a fluid passage passing through the filter body, and an annular portion protruding inwardly to the fluid passage at the base end;
    an orifice member substantially having a cylindrical shape and assembled in the fluid passage,
    wherein the orifice member includes a main member, an orifice penetrating through the main member, side exits formed in the main member to communicate the orifice and the fluid passage, a first flange portion formed on an outer peripheral face of the main member and having a knurling portion engaging an inner peripheral face of the base end around the fluid passage such that the main member is spaced from the inner peripheral face of the fluid passage, a trap member arranged around a part of the first flange portion between a flange of the first flange portion and the annular portion of the filter body to form a closed trap space therebetween in which a residue formed when the first flange portion is pressure-inserted into the fluid passage is caught, and
    a filtering member which is a cylindrical mesh member with a bottom and is arranged to surround the main member, the bottom covering a front side opening of the orifice member so that fluid flows through the filtering member and the bottom.

* * * * *